United States Patent [19]

Hamrick, Jr. et al.

[11] 3,904,936

[45] Sept. 9, 1975

[54] ROTATING TERMINAL BLOCK ASSEMBLY

[75] Inventors: Oliver Henry Hamrick, Jr., Wheeling; Joseph L. Zibilich, Chicago; Casimir Cwirzen, Des Plaines, all of Ill.

[73] Assignee: Cook Electric Company, Morton Grove, Ill.

[22] Filed: Mar. 14, 1974

[21] Appl. No.: 451,215

[52] U.S. Cl. .................. 317/118; 317/122; 339/34; 339/198 J; 174/60

[51] Int. Cl.$^2$ .......................................... H02B 1/20

[58] Field of Search ........ 317/118, 122; 174/59, 60; 179/91 R, 98; 339/34, 198 R, 198 J, 198 E, 179/198 K, 18 B

[56] References Cited

UNITED STATES PATENTS

| | | | |
|---|---|---|---|
| 3,376,542 | 4/1968 | Vlaminck | 174/60 |
| 3,418,621 | 12/1968 | Campbell, Jr. | 339/18 B |
| 3,784,728 | 1/1974 | De Bortoli | 317/118 |
| 3,831,128 | 8/1974 | Paluch | 317/118 |

*Primary Examiner*—Gerald P. Tolin
*Attorney, Agent, or Firm*—Mason, Kolehmainen, Rathburn & Wyss

[57] ABSTRACT

A rotating terminal block assembly is used in a telephone central office to interconnect one of a plurality of jumper wires to one of a plurality of equipment wires and includes a housing having relatively large jumper wire exit windows in an upper portion of a rear wall, a pair of side walls extending from the rear wall and relatively large equipment wire exit windows in a lower portion of the rear wall, which windows extend into a bottom ledge structure. Hingedly mounted between the side walls in a rotating terminal block panel which has opposite equipment wire and jumper wire termination faces or sides and a top edge surface divided into multiplane jumper and equipment wire gates. The terminal block panel also has a plurality of removable wire wrap terminals, portions of which terminals project from the equipment and jumper termination faces. The connected jumper wires extend from the terminals through the jumper wire gates and exit windows and the connected equipment wires extend from the terminals through the equipment wire gates and exit windows so that as the panel is rotated, the equipment and jumper wires bend a minimal amount. In the preferred embodiment, protective guards are provided on the bottom edge of the terminal block panel to prevent injury from the wire wrap terminals and a cover is provided to enclose the open portions of the housing.

16 Claims, 8 Drawing Figures

ROTATING TERMINAL BLOCK ASSEMBLY

The present invention relates to a new and improved rotating terminal block assembly and, more particularly, to a terminal block assembly that provides face-on or direct access to opposite termination faces of a terminal block panel for ease in making wire wrap terminations on the panel.

In a telephone central office, it is necessary to interconnect one of a plurality of equipment wires from various types of switching equipment or the like to one of a plurality of jumper wires associated with protective devices and other such types of telephone equipment. Normally, the connections of these jumper wires to the equipment wires are made by coupling the individual jumper wires to portions of terminals, such as wire wrap, solder, quick-clip or the like, projecting from one side of a terminal block and the equipment wires to portions of the terminals projecting from the other side of the terminal block. In many instances, the terminals are mounted on an angle when the terminal block is mounted on a standard mounting frame in a telephone central office. However, with the terminal block so mounted, both sides of the terminal block are not readily accessible for making terminations to the terminals with the jumper and equipment wires. This is especially the case when the terminal block is mounted on lower horizontal shelves of the mounting frame. In order to facilitate the making of these terminations, certain rotating terminal block assemblies have been developed in which a terminal block is mounted in a housing or the like and rotates so that both sides of the terminal block are readily accessible for face-on wire wrap or quick clip terminations.

One such type of rotating terminal block assembly has a rotating terminal block mounted in a metallic closure housing containing a rear wall, a pair of side walls, and a lower wall. Projecting from a jumper wire face of the terminal block is a plurality of quick clip terminals, wire wrap portions of which project from an opposite equipment wire face of the terminal block. The terminal block is hingedly mounted to hinge mounts attached to the side walls so that when the terminal block is in its closed position, the jumper wire face of the terminal block is accessible from the front, open portion of the housing. Normally, equipment wires first are connected to the wire wrap portions of the quick clip terminals.

In order to connect the equipment wires to the wire wrap portions of the quick-clip terminals projecting from the equipment wire face of the terminal block, the terminal block is moved from its closed position to an open position by rotating the terminal block through approximately 180°. With the terminal block in its open position, the equipment wire face of the terminal block is readily accessible from the front, open portion of the housing. The equipment wires then can be attached to the wire wrap portions of the terminals by extending the equipment wires through an opening in a lower corner of the rear wall and relatively narrow equipment wire slots projecting away from the equipment wire face of the terminal block near the top rear edge of the terminal block.

Once the equipment wires are so connected, the terminal block again is rotated to its closed position. The jumper wires are then coupled to portions of the quick-clip terminals projecting from the jumper wire face of the terminal block by extending the jumper wires through a pair of relatively narrow slots near the top portion of the rear wall and through relatively narrow gates projecting away from the jumper wire face near the top edge of the terminal block.

In order to enclose the open portion of the housing when the terminal block is in its closed position, a cover is provided with this type of terminal block assembly. The cover attaches to the terminal block along its bottom front edge and extends generally parallel to the terminal block when it is in its open position.

This type of terminal block assembly has certain disadvantages. In particular, the jumper and equipment wires are bent appreciably within the closure housing when the terminal block is rotated between its closed and open position resulting in the possibility of wires being damaged. In addition, the attaching of the cover to the terminal block in the above described manner tends to interfere with the coupling of the jumper and equipment wires to the termination clips on the terminal block especially when the terminal block assembly is mounted along side of or below or above other such terminal block assemblies.

This type of terminal block assembly also is difficult to mount on a mounting frame because the mounting holes are not key type holes so that the terminal block assembly must be mounted while the terminal block is in its open position. Moreover, rotation of the terminal block to its open position tends to be awkward because the terminal base must first be unscrewed, the terminal block rotated, and then the cover latched to a fanning strip to maintain the terminal block in its open position, which latching tends to cause the fanning strip to break after several operations. In addition, this type of terminal block assembly requires the factory assembling of a multitude of small parts.

Another terminal block assembly having a rotating terminal block has a housing made of some type of plastic which includes a rear wall from which extends a pair of side walls. The rear wall contains two sets of rather small exit windows, one set of jumper wire exit windows along the top portion of the rear wall and another set of equipment wire exit windows adjacent the bottom edge of the rear wall. The housing also contains a bottom wall structure or ledge that extends from the bottom edge of the rear wall between the side walls.

Hingedly mounted to the side walls is a terminal block that has disposed thereon a plurality of wire wrap terminals arranged in equally numbered groups. The terminal block rotates between a closed position with a jumper wire face of the terminal block being readily accessible from an open, front portion of the housing and an open position with an opposite equipment wire face being accessible from the front of the housing. The terminal block is secured in its closed position by a clip or latch on the bottom wall structure which extends toward the open, front portion of the housing and which clips into a recess near the bottom edge of the terminal block. In order to gain access to a rear or equipment wire face of the terminal block, the clip is released from the recess on the terminal block and the terminal block is rotated approximately 180° to an open position. The terminal block is secured in this open position by a projection that extends inwardly from one of the side walls and that abuts against the edge of the equipment wire face. This projection is released from the terminal block by bending slightly the side wall away from the terminal block.

Along the top edge of the terminal block (as it is oriented in its closed position) are a number of jumper wire gates extending upward from and generally parallel to the faces of the terminal block. In connecting the jumper wires to portions of the wire wrap terminals projecting from the jumper wire face of the terminal block, the jumper wires are placed through the jumper wire exit windows along the top of the rear wall and through the jumper wire gates. On the other hand, the equipment wires are connected to portions of the wire wrap terminals projecting from equipment wire faces of the terminal block. This is accomplished by extending the equipment wires through the equipment wire exit windows near the bottom of the rear wall and equipment wire gates that project generally perpendicular to the equipment wire face near the top edge of the terminal block and over the portion of the wire wrap terminals projecting from the equipment face.

Due to the positioning of the jumper wire gates and the relatively small size of the jumper wire exit windows in the rear wall, the jumper wires are bent almost 180° when the block is rotated between its closed and open positions. The bending of the jumper wires in this manner tends to cause the jumper wires to be damaged when the terminal block is so rotated. Moreover, this terminal block assembly has no known provisions for any type of cover to cover the open, front and top portions of the housing when the terminal block is in its closed position. In addition, there is a tendency in this type of terminal block assembly to have injuries occur from contact with the portions of the wire wrap terminals projecting from the jumper and equipment wire faces and from releasing the terminal block from the latch securing the terminal block in its closed position.

Accordingly, objects of the present invention are to provide a new and improved rotating terminal block assembly for interconnecting one of a multiplicity of jumper wires or the like to one of a multiplicity of equipment wires or the like in a telephone central office; to provide a new and improved rotating terminal block assembly in which both faces or sides of the terminal block panel are made readily accessible; to provide a new and improved rotating terminal block assembly in which the wires are bent relatively slightly when the terminal block panel is rotated; to provide a new and improved rotating terminal block assembly with keyhole type mounting slots in the housing to facilitate the mounting of the assembly on a telephone office mounting frame; to provide a new and improved rotating terminal block assembly which has a cover that does not interfere with the connecting of wires to the terminal block panel; to provide a new and improved rotating terminal block assembly that has a universal terminal configuration requiring only one tool for installation; to provide a new and improved terminal block assembly that has protective quards so as to minimize any injuries that might occur from pins projecting from the terminal block panel faces and to simplify the positioning of locks or latches for the terminal block panel in order to conserve operating time.

In accordance with these and many other objects of the present invention, an embodiment of the present invention comprises a rotating terminal block assembly for use in a telephone central office to interconnect one of a plurality of jumper wires to one of a plurality of equipment wires. The terminal block assembly has a housing including a rear wall and a pair of side walls extending from the opposite ends of the rear wall. The housing also contains a ledge portion extending between the side walls and extending away from the bottom edge of the rear wall. The terminal block panel is rotatably mounted between the side walls and rotates approximately 180° between a closed position with a jumper wire face of the terminal block panel accessible from the open, front portion of the housing and an open position with an opposite equipment wire face of the terminal block panel accessible from the front of the housing.

The terminal block panel has a plurality of wire wrap terminals extending through it, portions of which terminals project from each of the opposite jumper and equipment wire faces. Along the top edge of the terminal block panel (as it is oriented in its closed position) are sets of equipment and jumper wire gates extending away from the equipment and jumper wire faces, respectively, of the terminal block panel. To couple the equipment wires to the portion of the terminals projecting from the equipment wire face of the terminal block panel, the terminal block panel is rotated to its open position and the equipment wires are extended through a set of relatively large equipment wire exit windows located in the lower portion of the rear wall and the rear portion of the ledge and through the equipment wire gates. Similarly, to couple the jumper wires to the portions of the wire wrap terminals projecting from the jumper wire face, the terminal block panel is placed in its closed position and the jumper wires are extended through a relatively large set of jumper wire exit windows located along the top portion of the rear wall and through the jumper wire gates.

As the terminal block panel is rotated between its closed and open positions, the geometry of the housing, and particularly the exit windows and gates, enables the equipment and jumper wires to move in and out of the housing within the relatively large exit windows resulting in a minimum amount of bending of the wires and frictional wear on the insulation of the wires during the rotation of the terminal block panel. The terminal block panel is secured in its closed position by a clip mechanism projecting from the ledge that projects through a thumb guard extending from the bottom edge of the terminal block panel and that clips onto the terminal block panel. In order to secure the terminal block panel in its open position, a projection on one of the side walls projects inwardly into the housing and abuts against the equipment wire face. The clip mechanism is released from the terminal block panel by bending it away from the bottom of the terminal block panel whereas the projection securing the terminal block panel in its open position is released by bending the side wall away from the terminal block panel.

In the preferred embodiment, protective guards are also provided on the lower edge of the terminal block panel to prevent injury from the wire wrap terminals. In addition, a cover is provided to enclose the open portion of the housing and provide space for a line record card and block identification. This cover snaps onto the housing and is captivated to the housing by a pair of straps attached to the lower portion of the rear wall near the side walls.

Many other objects and advantages of the present invention will become apparent from considering the following detailed description in conjunction with the drawings in which.

Figures 1, 2:
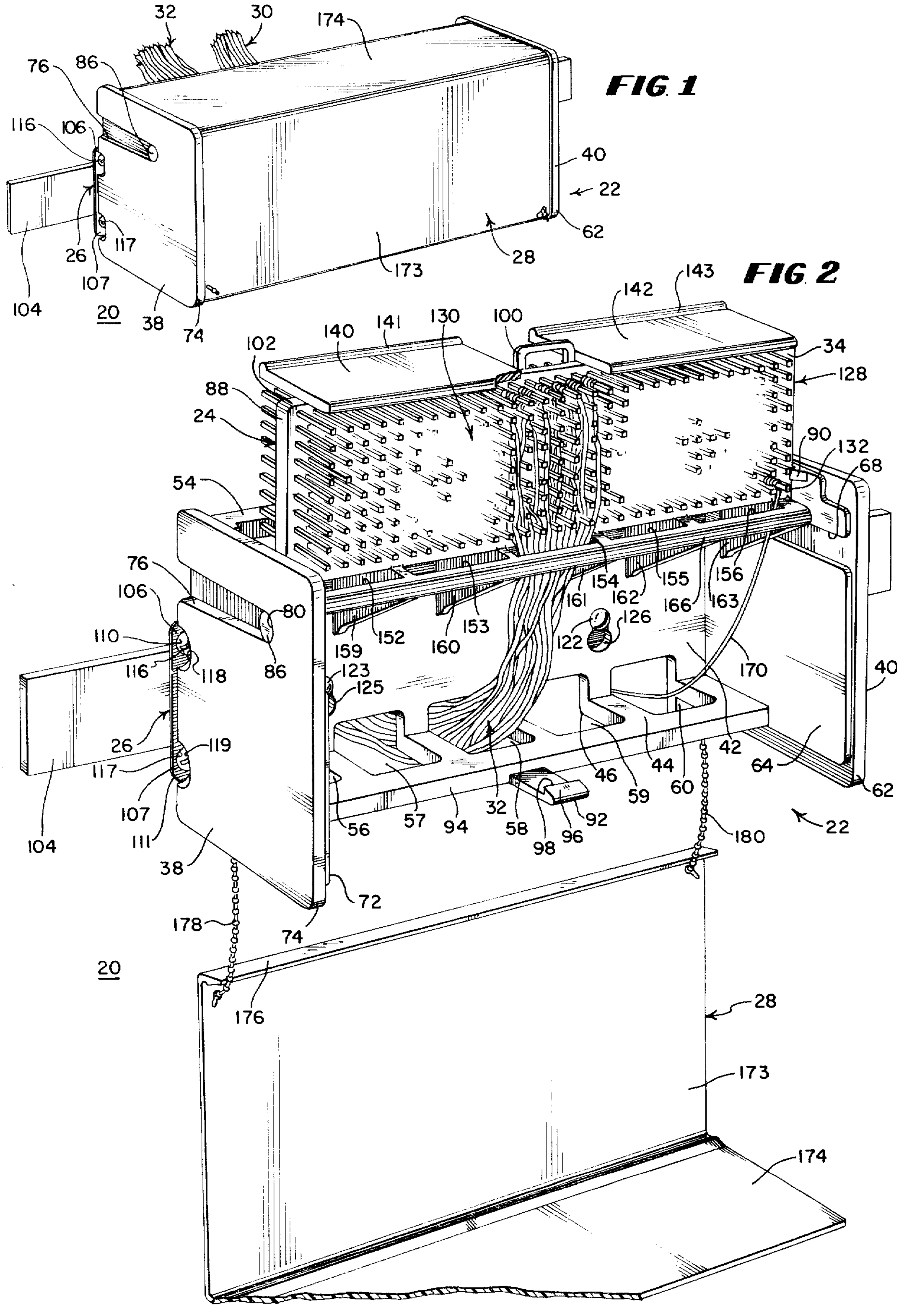
FIG. 1 is a front perspective view of the rotating terminal block assembly embodying the present invention with a cover enclosing the open portions of the assembly.
FIG. 2 is a front perspective view of the rotating terminal block assembly of FIG. 1 with a rotating terminal block panel in its open position and the cover partly cut away and positioned away from the terminal block housing.
Figure 3:
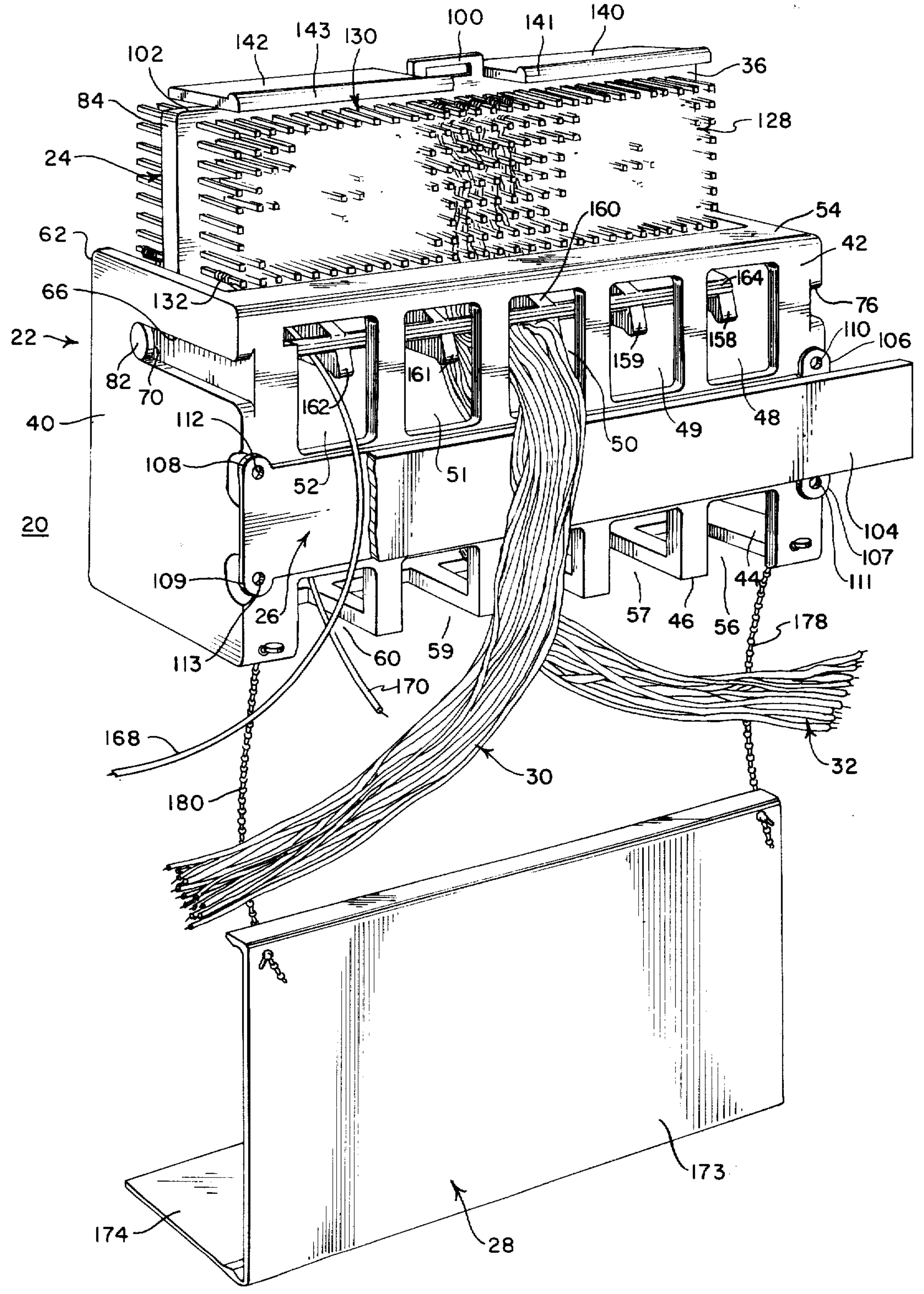
FIG. 3 is a rear perspective view of the rotating terminal block assembly as it is shown in FIG. 2 with a portion of the mounting frame cut away.
Figure 4:
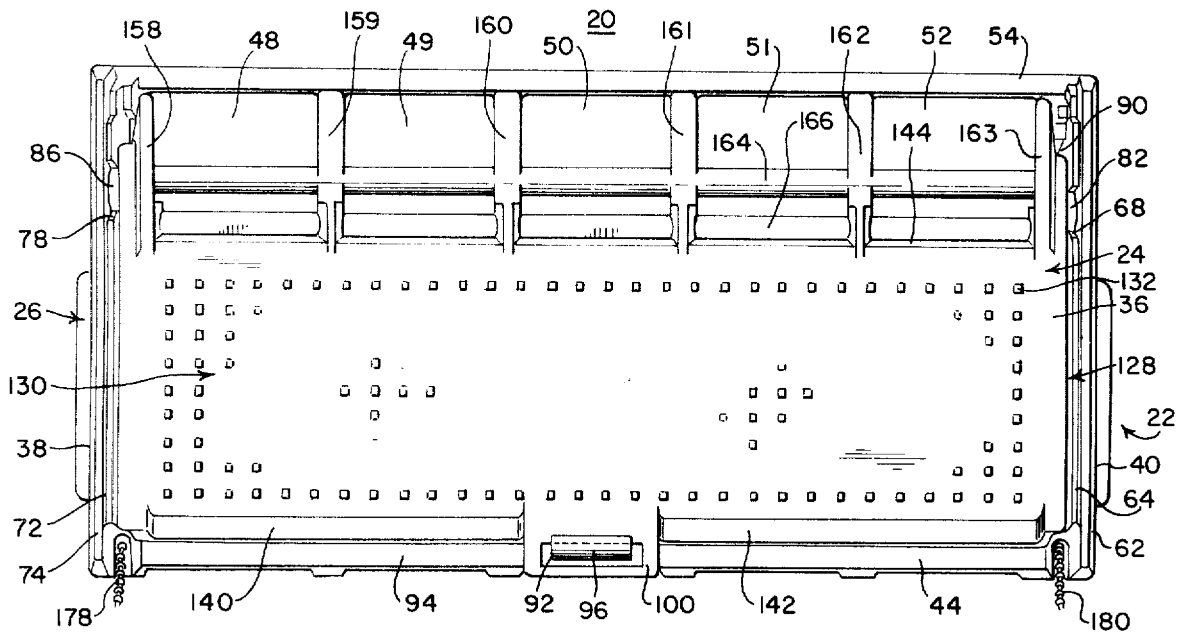
FIG. 4 is a front view of the rotating terminal block assembly as shown in FIG. 1 with the cover removed.
Figure 5:
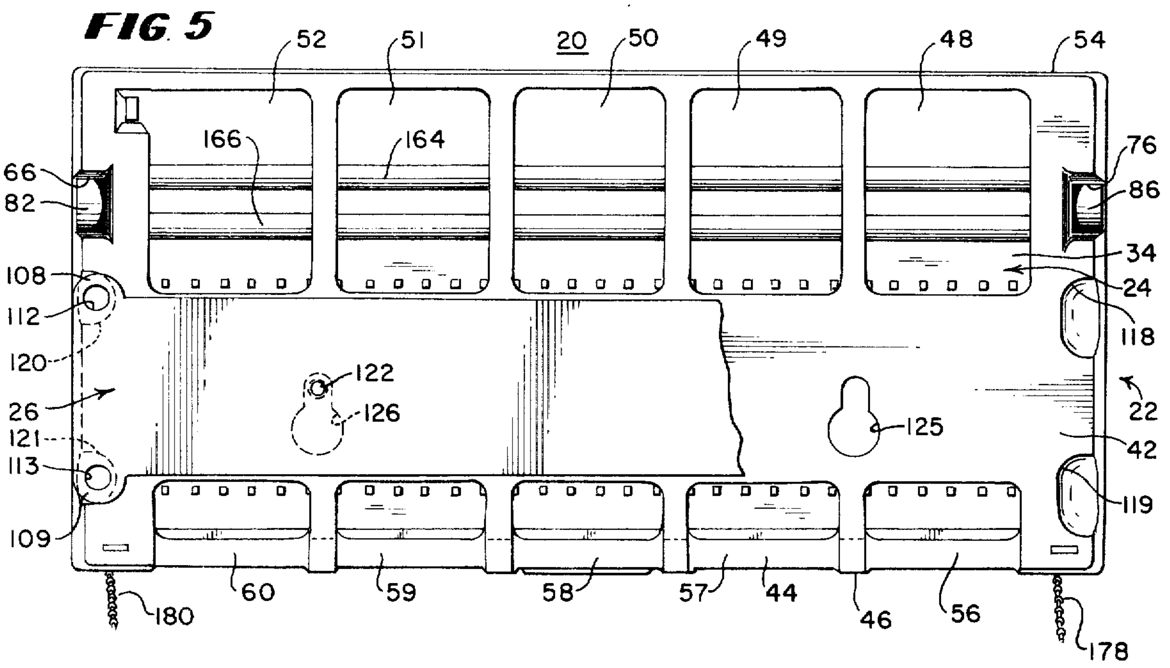
FIG. 5 is a rear view of the rotating terminal block assembly shown in FIG. 4 with part of a mounting bracket cut away.
Figure 6:
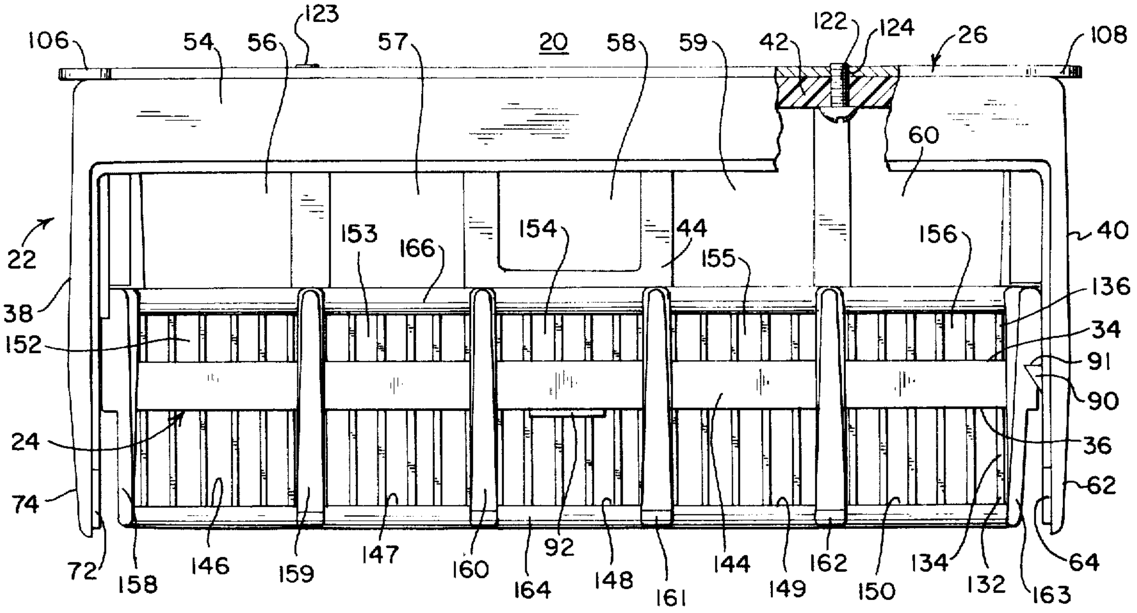
FIG. 6 is a top view of the rotating terminal block assembly shown in FIG. 4 with a portion of the rear wall cut away.

Referring now more specifically to FIGS. 1–6, there is illustrated a rotating terminal block assembly which is indicated generally as 20 and which embodies the present invention. The rotating terminal block assembly 20 includes a housing 22, a rotating terminal block panel 24, a mounting bracket 26, and a cover 28. The terminal block panel 24 is used to interconnect one of a plurality of jumper wires such as jumper wires 30 to one of a plurality of equipment wires such as equipment wires 32. The terminal block panel 24 is hingedly mounted in the housing 22 so as to be rotatable between an open position, as shown in FIGS. 2 and 3, and a closed position, as shown in FIGS. 4–6. The positioning of the terminal block panel 24 in its open and closed positions is further illustrated in FIG. 7 with the terminal block panel 24 shown in the phantom lines when in its open position and in the dotted or dashed lines when in its closed position. By having the terminal block panel 24 rotatably mounted in this manner within the housing 22, opposite equipment and jumper wire faces 34 and 36, respectively, of the terminal block panel 24 are readily accessible from a front, open portion of the housing 22.

The housing 22 consists of opposed side walls 38 and 40, a rear wall 42 interconnecting the side walls 38 and 40, and a ledge structure or portion 44 extending between the side walls 38 and 40 near a lower edge 46 of the rear wall 42. The housing 22 preferably is made of a self-extinguishing type of material, such as a thermal plastic polycarbonate resin, that possess a relatively good impact strength, is heat resistant, has good dimensional stability, and has appropriate dielectric properties.

More specifically, the rear wall 42 of the housing 22 has a set of generally rectangularly shaped jumper wire exit windows 48–52 disposed therein that extend from near a top edge 54 of the rear wall 42 to a point on the rear wall 42 that, in the disclosed embodiment, is approximately 40–45 per cent of the distance from the top edge 54 to the bottom edge 46. By having these windows 48–52 of relatively large size and extending a substantial distance from the top edge 54 toward the bottom edge 46, the jumper wires 30 easily can be placed through the windows 48–52 and move rather easily in and out of the housing 22 within the windows 48-52 during the rotation of the terminal block panel 24. Another set of relatively large equipment wire exit windows 56–60 are disposed in the rear wall 42 and extend into the ledge structure 40. The windows 56–60 likewise are relatively large so that the equipment wires 32 easily can be placed through the windows 56–60 and move in and out of the housing 22 within the windows 56–60 when the terminal block panel 24 is rotated. In addition, by having a substantial portion of the equipment wire windows 56–60 disposed in the ledge structure 44, the equipment wires 32 are bent to a lesser extent and the insulation on the equipment wires 32 is subjected to less frictional wear than previously designed rotating terminal block assemblies during the rotation of the terminal block panel 24.

The side walls 38 and 40 are substantially identical in structure with the side wall 40 formed of an outer panel 62 and an inner panel 64. The outer panel 62 is generally rectangular in configuration and has a somewhat tapering elongated groove 66 (FIGS. 3 and 7) extending from the portion of the outer panel 62 adjacent the rear wall 42 toward the front portion of the housing 22. The inner panel 64 also is generally rectangular in configuration but slightly smaller than the outer panel 62. The inner panel 64 has a somewhat tapering elongated groove 68 extending from the front portion of the inner panel 64 toward the rear wall 42 of the housing 22. The intersection of the elongated grooves 66 and 68 forms a hole 70 in the side wall 40. In a similar manner, the side wall 38 has an inner panel 72 and an outer panel 74. The outer panel 74 has an elongated groove 76 intersecting an elongated groove 78 in the inner panel 72 to form a hole 80.

The hole 70 in the side wall 40 receives a generally round projection 82 extending from a side edge 84 of the terminal block panel 24. Likewise, the hole 80 in the side wall 38 receives a generally round projection 86 extending from a side edge 88 of the terminal block panel 24. Since the projections 82 and 86 are allowed to rotate within the holes 70 and 80, respectively, the terminal block panel 24 is capable of rotating between its open and closed positions.

In order to secure the terminal block panel 24 in its open position, a wedge 90 projects inwardly from the inner panel 64 on the side wall 40. The wedge 90 has an edge surface 91 (FIG. 6) that abuts against the equipment wire face 34 when the terminal block panel 24 is in its open position. This is particularly illustrated in FIG. 2 of the drawings. In order to release the wedge 90 from the terminal block panel 24, pressure is applied outwardly on the side wall 40 which has enough resiliency to allow the side wall 40 and thereby the wedge 90 to move away from the equipment wire face 34. Thereafter, the terminal block panel 24 can be moved to its closed position.

On the other hand, the terminal block panel 24 is maintained in its closed position by a tongue latch or clip 92 that projects toward the front of the housing 22 from a front edge 94 of the ledge structure 44. The latch 92 has a wedge shaped end portion 96 with a surface 98. When the terminal block panel 24 is in its closed position, the end portion 96 extends through a generally elongated U-shaped thumb guard 100 extending from a lower edge 102 of the terminal block panel 24 and the surface 98 abuts against the jumper wire face 36 of the terminal block panel 24. In order to release the latch 92, pressure is applied downwardly on the end portion 96 and the latch 92 bends away from the lower edge 102.

When a substantial number of jumper wires 30 and equipment wires 32 are coupled to the terminal block panel 24, there is a tendency for the terminal block panel 24 to spring toward its open position as the latch 92 is released. In so moving, a person releasing the latch 92 could be injured. However, by having the thumb guard 100 projecting from the lower edge 102 of the terminal block panel 24 and encompassing the latch 92, a person's thumb or other finger is moved with the terminal block panel 24 as it springs toward its open position. In this manner, no injuries occur when releasing the latch 92.

The housing 22 is normally attached to a frame mounting structure, such as the frame 104, in a telephone central office by the mounting bracket 26. More specifically, the mounting bracket 26 is a generally elongated structure made of metal or the like with rounded, flared end portions 106–109, each of which has a hole 110–113, respectively. The holes 110–113 are formed so that screws 114–117 are insertable through the holes 110–113 into the central office framing structure. In order that the screws 114–117 extending the holes 110–113 do not hinder the mounting of the housing 22 to the bracket 26, keyhole notches 118–121 are formed in the rear wall 42.

The mounting bracket 26 in turn is secured to the rear wall 42 of the housing 22 by screws or the like, such as screws 122 and 123, that are insertable into holes, such as hole 124, in the mounting bracket 26 and that extend through key-shaped slots or holes 125 and 126 in the rear wall 42. The shape of the slots 125 and 126 allows the housing 22 to be moved rather easily from the mounting bracket 26 and thereby from the frame 104 by merely lifting up the housing 22 and removing the housing 22 from the screws 122 and 123.

Figure 8:
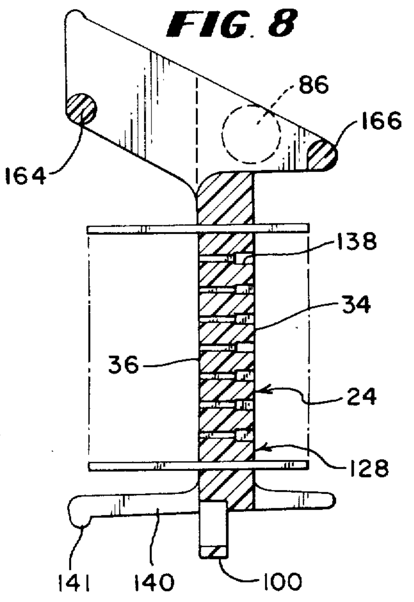
FIG. 8 is a cross-sectional view of the terminal block panel.

Referring now to the terminal block panel 24, the terminal block panel 24 consists primarily of a main body poriton 128 that is generally rectangular in shape and made of substantially the same type of material forming the housing 22. The opposite faces of the body portion 128 are the jumper and equipment wire faces 36 and 34, respectively. Extending through the body portion 128 is a plurality of general rectangular wire wrap terminals, generally designated as 130. As illustrated in connection with a wire wrap terminal 132, each of the wire wrap terminals 130 has an end portion 134 projecting out from the jumper wire face 36 of the body portion 128 and another end portion 136 projecting away from the equipment wire face 34 of the body portion 128. Advantageously, the wire wrap terminals 130 can be removed from the terminal body portion 128 by merely applying heat to the terminals 130 and inserting another terminal like the terminal 132 in the resulting hole similar to the hole 138 (FIG. 8) in the body portion 128.

It is significant to note that the illustrated two hundred and seventy terminals 130 are arranged in nine equally spaced rows and thirty equally spaced columns. Since the rows and columns of the pins 130 are not grouped, the terminal block panel 24 presents a universal configuration within the nine by thirty matrix for the terminals 130 so that the rotating terminal block assembly 20 can be used in different applications. In particular, with the universal configuration, the terminal block assembly 20 is capable of terminating cables from telephone office equipment even if the cables contain feature/function conductors or the conductors are grouped in pairs, triples, quads and so on.

Along the lower edge 102 of the terminal block panel 24 are a generally flat protective guard panel 140 having a rounded lip portion 141 and a generally flat protective guard panel 142 having a rounded lip portion 143. The protective quard panels 140 and 142 extend generally perpendicular to the plane of the body portion 128 and project away from the equipment wire face 34 and jumper wire face 36 a distance at least as great as the length of the end portions 136 and 134, respectively. The panels 140 and 142 prevent a person working with the rotating terminal block assembly 20 from being injured due to contact with the terminals 130. This is especially true when the terminal block panel 24 is being rotated between its open and closed positions. Without the panels 140 and 142, one would tend to grasp the terminals 130 in rotating the terminal block panel 24 resulting in various forms of injury.

Adjacent a top edge 144 of the terminal block panel 24 is a set of jumper wire gates 146–150 and a set of equipment wire gates 152–156. The jumper wire gates 146–150 are formed by ridge structures 158–163 that are mounted on the top edge 144 and extend generally perpendicular to the plane of the body portion 128 and by a crossing bar 164 extending between end portions of the ridge structures 158–163. The equipment wire gates 152–156 are formed by the ridge structures 158–163 and a crossing bar 166 attached to the other ends of the ridge structures 158–163.

As is apparent from FIG. 6 of the drawings, the jumper wire gates 146–150 extend over the end portions 134 of the wire wrap terminals 130 whereas the equipment gates 152–156 extend over the end portions 136 of the wire wrap terminals 130. By having the jumper wire gates 146–150 rather large in size and directly overlying at least a substantial portion of the end portions 134, the jumper wires 30 can easily be coupled to the end portions 134 of the terminals 130 and the jumper wires 30 are bent to a minimal extent during the rotation of the terminal block panel 24 between its open and closed positions. Similarly, the positions of the equipment wire gates 152–156 over the end portions 136 facilitate the coupling of the equipment wires 32 to the end portions 136 of the wire wrap terminals 130.

Figure 7:
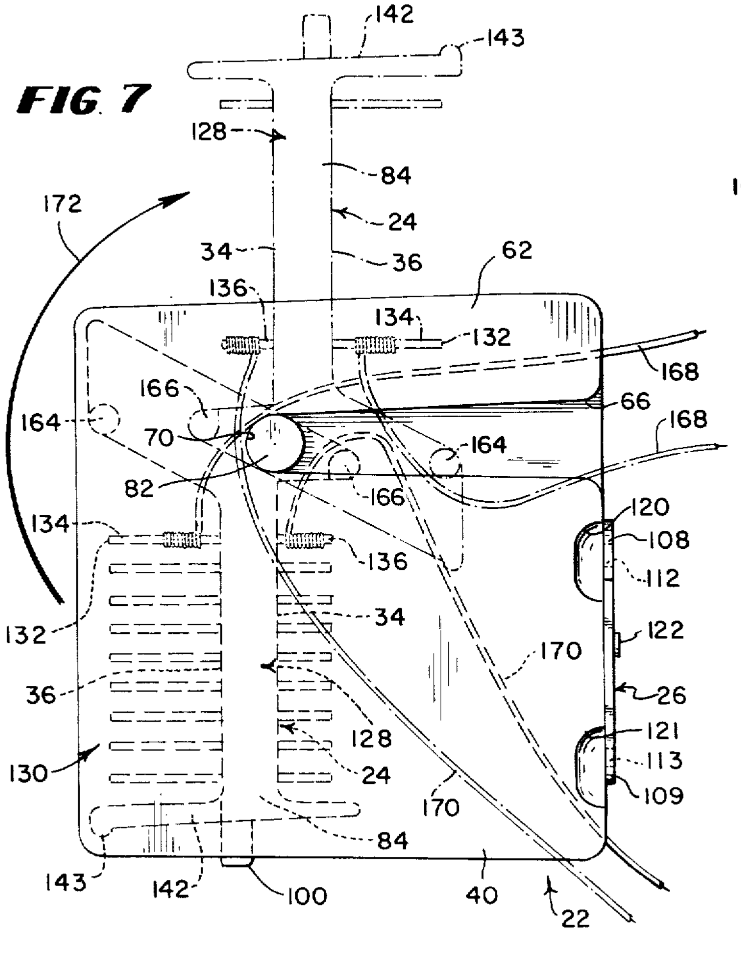
FIG. 7 is a side view of the rotating terminal block assembly shown in FIG. 4 illustrating the positions of the rotating terminal block panel as it is rotated.

The coupling of the jumper and equipment wires to the wire wrap terminals 130 is best illustrated with reference to FIGS. 2, 3 and 7, in which figures is shown the coupling of a jumper wire 168 to the end portion 134 of the terminal 132 and the coupling of an equipment wire 170 to the end portion 136 of the terminal 132. In FIG. 7, the jumper wire 168 and the equipment wire 170 are shown in dashed or dotted lines when the terminal block panel 24 is in its closed position and in phantom lines when the terminal block panel 24 is in its open position.

More specifically, in order to couple the equipment wire 170 to the terminal 132, the terminal block panel 24 is rotated to its open position in the direction of an arrow 172 in FIG. 7. With the terminal block panel 24 secured in its open position by the wedge 90, the end portion 136 of the terminal 132 is readily accessible from the front open portion of the housing 22. The equipment wire 170 then is extended through the equipment wire exit window 60 and through the equipment wire gate 156 toward the terminal 132. The equipment wire 170 is coupled to the end portion 136 by wrapping the equipment wire 170 about the end portion 136.

The standard requirement for making a wire wrap connection is to wrap a wire about a wire wrap terminal five times. As is apparent from FIG. 7, the end portion 136 of the terminal 132 is shorter in length than the end portion 134. However, the end portion 136 is of sufficient length to enable the equipment wire 170 to be wrapped around the end portion 136 five times, thus leaving sufficient room to allow another wire wrap connection of five wire turns to be made on the end portion 136 for test equipment or the like.

Once all of the equipment wires, such as the equipment wires 32 and 170, have been coupled to the terminals 130, the wedge 90 is moved away from the terminal block 24 and the terminal block panel 24 is moved to its closed position. As the terminal block 24 is rotated, the positioning of the equipment wire gates 152–156 and the size of the equipment wire exit windows 56–60 allows the equipment wires 32 and 170 to move in and out of the housing 22 and a minimum amount of stress is placed on the equipment wires 32 and 170 during the rotation of the terminal block panel 24. The positions of the equipment wire 170 when the terminal block panel 24 is in its open and closed position is best illustrated in FIG. 7.

Once in its closed position (as illustrated in FIG. 7 by the dash lines), the jumper wire 168 can be coupled to the terminal 130. In order to so couple the jumper wire 168 to the terminal 130, the jumper wire 168 is extended through the jumper wire exit window 52 in the top portion of the rear wall 42, over the cross bar 166 partially forming the equipment wire gate 156 and the top edge 144 of the terminal block panel 24, and through the jumper wire gate 150. Thereafter, the jumper wire 168 is connected to a portion of the end portion 134 of the terminal 132 by making a wire wrap connection of the jumper wire 168 to the end portion 134. The remaining portion of the end portion 134 of the terminal 130 is of sufficient length to make two additional wire wrap connections so as to connect test equipment or the like.

Once the jumper wires, such as the jumper wires 30 and/or 168, and the equipment wires, such as the equipment wires 32 and 170, are coupled to the wire wrapped terminals 130, the terminal block panel 24 may be rotated, as necessary between its open and closed positions as illustrated in FIG. 7. Because of the positioning of the jumper wire gate 150 and the relatively large size of the jumper wire exit window 52, the jumper wire 168 is allowed to move in and out of the housing 22 so as to be bent only approximately 90° as the terminal block panel 24 is rotated between its closed and open positions.

In addition, after the jumper wires 30 and the equipment wires 32 are coupled to the terminals 130 and the terminal block panel 24 is placed in its closed position, the cover 28 can be fitted about the housing 22 as shown in FIG. 1 of the drawings. The cover 28 not only assists in protecting the connections made on the terminal block panel 24 from dirt and the like, but also provides for personnel safety from the sharp wire wrap terminals 130 when the personnel are working on other rotating terminal block assemblies in the general proximity of the rotating terminal block assembly 20. Moreover, since the cover 28 has a pair of side sections 173 and 174 that form approximately a right angle, the cover 28 is capable of holding a line identification card on the internal portion of the side section 173. The side section 174 fits over the top open portion of the housing 22 whereas the side section 173 encloses the front open portion of the housing 22. The cover 28 is maintained in its enclosing position about the open portions of the housing 22 by the snap fitting of an angular flange portion 176 about the lower portions of the outer panels 62 and 174 of the side walls 40 and 38, respectively.

Advantageously, when the cover 28 is removed from the housing 22, it is captivated in the general location of the housing 22 by a pair of plastic straps 178 and 180 that connect to the side portion 173 of the cover 28 adjacent the angular flange portion 176. In turn, the straps 178 and 180 are connected to the rear wall 42 of the housing 22 near the lower edge 46 of the rear wall 42 and adjacent the side walls 38 and 40, respectively. By having the cover 28 captivated to the housing 22 by the straps 178 and 180, the cover 28 does not interfere with the coupling of the equipment wires 32 and 170 or the jumper wires 30 and 168 to the wire wrap terminals 130. In addition, with the cover 28 always in close proximity to the housing 22, the terminal or line assignment or identification record card (not shown) can be placed on the side portion 173 and is easily readable while connecting the jumper and equipment wires to the terminals 130.

Although the present invention is described with reference to a single illustrative embodiment thereof it should be understood that numerous other modifications and embodiments of the invention can be devised by those skilled in the art that will fall within the spirit and scope of the principles of this invention.

What is claimed as new and desired to be secured by U.S. Letters Patent of the United States is:

1. A rotating terminal block assembly coupling a plurality of first conductors to a plurality of second conductors, said assembly comprising:

a housing having a pair of side walls interconnected by a rear wall having first and second edge portions extending between said side walls and a ledge means extending from said rear wall adjacent said second edge portion, a first set of exit windows through which said first conductors are extendable, said first set of exit windows are formed in said rear wall adjacent said first edge portion of said rear wall, a second set of exit windows through which are extendable said second conductors, each window of said second set of exit windows is formed partially in said rear wall adjacent said second edge portion and partially in said ledge means, a terminal block panel rotatably mounted between said side walls, said terminal block panel having first and second faces and first and second edges, a plurality of terminals mounted on said terminal block panel, a first portion of each of said terminals extends out from said first face and is coupled to one of said plurality of first conductors and a second portion of each of said terminals extends out from said second face and is coupled to one of said plurality of second conductors, first gate means through which said first conductors extend, said first gate means projects from said first edge of said terminal block panel and away from said first face, and second gate means through which said second conductors extend, said second gate means projects from said first edge of said terminal panel and away from said second face.

2. The rotating terminal block assembly as set forth in claim 1 wherein each of said first set of exit windows extend from near the first edge portion of said rear wall a substantial distance toward said second edge portion of said rear wall.

3. The rotating terminal block assembly as set forth in claim 1 wherein said housing and said terminal block panel is made of plastic.

4. The rotating terminal block assembly as set forth in claim 1 including a cover means detachably mounted about said terminal block panel, said cover means having strap means maintaining said cover means adjacent to said housing when removed from between said side walls.

5. The rotating terminal block assembly as set forth in claim 1 including a mounting bracket removably attached to said rear wall.

6. A rotating terminal block assembly interconnecting a plurality of first conductors to one of a plurality of second conductors, said assembly comprising:

a housing having a pair of side walls, a rear wall having first and second edge portions, and a ledge means extending from the second edge portion of said rear wall between said side walls, first exit means formed in said rear wall adjacent said first edge portion, second exit means partially formed in said rear wall and partially formed in said ledge means, a terminal block panel hingedly mounted between said side walls so as to be rotatable between first and second positions, said terminal block panel having first and second terminal faces, a plurality of terminals disposed on said terminal block panel, each of said terminals having a first terminal portion extending out from said first terminal face and coupled to one of said plurality of first conductors and a second terminal portion extending out from said second terminal face and coupled to one of said plurality of second conductors, first gate means overlying said first terminal portion such that said plurality of first conductors extend from said first terminal portions through said first gate means and first exit means, and second gate means overlying said second terminal portion such that said plurality of second conductors extend from said second terminal portions through said second gate means and said second exit means.

7. The rotating terminal block assembly as set forth in claim 6 wherein said terminal block panel is rotatable approximately 180° between said first and second positions and said first terminal face being accessible from the front, open portion of said housing when said terminal block panel is in said first position and said second terminal face being accessibly when said terminal block panel is in said second position.

8. The rotating terminal block assembly as set forth in claim 6 wherein each of said terminals is readily removable from said terminal block panel.

9. The rotating terminal block assembly as set forth in claim 6 wherein said first terminal portions are longer than said second terminal portions.

10. A rotating terminal block assembly comprising:

a housing having a pair of side walls, a rear wall extending between said side walls, and a bottom ledge means extending from said rear wall between said side walls, a terminal block panel rotatably mounted between said side walls so as to be rotated between first and second positions, said terminal block panel having first and second faces, a plurality of terminals extending through said terminal block panel, said terminals having a first terminal portion extending from said first face and a second terminal portion extending from said second face, a latch means extending from said bottom ledge means away from said rear wall, said latch means clips into abutting relationship with said first face to secure said terminal block panel in said first position, and a guard means on said terminal block panel encompassing said latch means when it is securing said terminal block panel in said first position.

11. The rotating terminal block assembly as set forth in claim 10 wherein said latch means includes an end portion with a surface thereon, said surface abutting against said first face of said terminal block panel to secure said terminal block panel in said first position, said latch means being released from having said surface in abutting relation with said first face by moving said end portion away from said terminal block panel within said guard means.

12. The rotating terminal block assembly as set forth in claim 11 wherein said guard means is generally U-shaped and wherein said end portion of said latch means extends through said U-shaped guard means in order to position said surface in abutting relationship with said first face.

13. A rotating terminal block assembly comprising:

a housing, a terminal block panel rotatably mounted in said housing to rotate between first and second positions, said terminal block panel having first and second faces and first and second edge portions, a plurality of terminals mounted on said terminal block panel, each of said terminals having terminal portions extending out from both said first and second faces, a plurality of gate means extending out from said first and second faces at said first edge portion, and a protective means extending out from said first and second faces at said second edge of said terminal block panel, said protective means extends away from said first and second faces a distance at least as great as the distance the terminal portions extend from said first and second faces.

14. The rotating terminal block assembly as set forth in claim 13 wherein said protective means includes a pair of generally flat panels extending generally perpendicular to the plane of the terminal block panel, each of said flat panels having a rounded end portion on the portion of the panel extending from the first face of said terminal block panel.

15. A rotating terminal block assembly comprising:

a housing having a pair of side walls and a rear wall extending between said side walls, each of said side walls and rear wall has an upper edge and a lower edge, a terminal block panel rotatably mounted between said side walls, said terminal block panel being rotatable between first and second positions, a cover means removably mounted between said side walls to enclose said terminal block panel in said housing when said terminal block panel is in said first position, and strap means connected to said housing adjacent said lower edge of one of said walls and connected to said cover means so that said cover means is captivated to said housing when said cover means is removed from between said side walls to allow said terminal block panel to be rotated to said second position.

16. The rotating terminal block assembly as set forth in claim 15 wherein said cover means has a pair of side sections forming approximately a right angle, one of said side sections having an angular flange portion for mounting said cover means between said side walls.

* * * * *

PO-1050
(5/69)

UNITED STATES PATENT OFFICE
CERTIFICATE OF CORRECTION

Patent No. 3,904,936 Dated September 9, 1975

Inventor(s) Hamrick, Jr., et al

It is certified that error appears in the above-identified patent and that said Letters Patent are hereby corrected as shown below:

Delete "one of" in line 30, column 11 (line 2 of claim 6).

Signed and Sealed this

*second* Day of *December 1975*

[SEAL]

*Attest:*

RUTH C. MASON
*Attesting Officer*

C. MARSHALL DANN
*Commissioner of Patents and Trademarks*